US012798019B2

(12) United States Patent
Kim et al.

(10) Patent No.: US 12,798,019 B2
(45) Date of Patent: Nov. 17, 2026

(54) WELDING JIG

(71) Applicant: LG Energy Solution, Ltd., Seoul (KR)

(72) Inventors: Kyung-Mo Kim, Daejeon (KR); Ho-June Chi, Daejeon (KR); Kyung-Woo Kim, Daejeon (KR); Jeong-O Mun, Daejeon (KR); Jin-Yong Park, Daejeon (KR); Jhin-Ha Park, Daejeon (KR); Hee-Jun Jin, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1098 days.

(21) Appl. No.: 17/641,565

(22) PCT Filed: Sep. 22, 2020

(86) PCT No.: PCT/KR2020/012798
§ 371 (c)(1),
(2) Date: Mar. 9, 2022

(87) PCT Pub. No.: WO2021/075746
PCT Pub. Date: Apr. 22, 2021

(65) Prior Publication Data

US 2022/0297247 A1 Sep. 22, 2022

(30) Foreign Application Priority Data

Oct. 18, 2019 (KR) ........................ 10-2019-0130073

(51) Int. Cl.
*B23K 37/04* (2006.01)
*B23K 26/22* (2006.01)
(Continued)

(52) U.S. Cl.
CPC .......... *B23K 37/0435* (2013.01); *B23K 26/22* (2013.01); *B23K 26/244* (2015.10);
(Continued)

(58) Field of Classification Search
CPC ................ B23K 37/0435; B23K 31/02; B23K 37/0211; B23K 37/0443; B23K 2101/36;
(Continued)

(56) References Cited

U.S. PATENT DOCUMENTS 11,398,662 B2 * 7/2022 Lee ..................... H01M 50/517
11,527,805 B2 * 12/2022 Lee ..................... H01M 50/531
(Continued)

FOREIGN PATENT DOCUMENTS

CN 103460448 A 12/2013
CN 208889813 U * 5/2019
(Continued)

OTHER PUBLICATIONS

Machine English Translation of WO-2018131843-A1 (Year: 2018).*
(Continued)

*Primary Examiner* — Erwin J Wunderlich
(74) *Attorney, Agent, or Firm* — Lerner David LLP

(57) ABSTRACT

Disclosed is a welding jig for welding an electrode lead of a battery cell and a sensing bus bar of a bus bar assembly to each other, and the welding jig includes a jig body disposed above the electrode lead and the sensing bus bar during the welding; and a positioning guide unit coupled to the jig body and configured to make a step correction in at least three directions when the electrode lead and the sensing bus bar are welded.

8 Claims, 15 Drawing Sheets

(51) Int. Cl.

| | |
|---|---|
| ***B23K 26/244*** | (2014.01) |
| ***B23K 31/02*** | (2006.01) |
| ***B23K 37/02*** | (2006.01) |
| ***H01M 10/052*** | (2010.01) |
| ***H01M 50/502*** | (2021.01) |
| ***H01M 50/505*** | (2021.01) |
| ***H01M 50/516*** | (2021.01) |
| ***H01M 50/536*** | (2021.01) |
| *B23K 101/36* | (2006.01) |
| *B23K 101/38* | (2006.01) |
| *H01M 50/147* | (2021.01) |

(52) U.S. Cl.

CPC .......... *B23K 31/02* (2013.01); *B23K 37/0211* (2013.01); *B23K 37/0443* (2013.01); *H01M 10/052* (2013.01); *H01M 50/516* (2021.01); *H01M 50/536* (2021.01); *B23K 2101/36* (2018.08); *B23K 2101/38* (2018.08); *H01M 50/147* (2021.01); *H01M 50/502* (2021.01); *H01M 50/505* (2021.01); *Y02E 60/10* (2013.01)

(58) Field of Classification Search

CPC .. B23K 26/22; B23K 26/244; B23K 2101/38; H01M 50/516; H01M 50/536; H01M 50/147; H01M 50/502; H01M 50/505; H01M 10/052; Y02E 60/10

See application file for complete search history.

(56) References Cited

U.S. PATENT DOCUMENTS

| | | | | |
|---|---|---|---|---|
| 11,660,710 | B2 * | 5/2023 | Kim | H01M 10/0413 219/161 |
| 12,068,503 | B2 * | 8/2024 | Kim | H01M 50/105 |
| 12,138,716 | B2 * | 11/2024 | Kim | B23K 37/0443 |
| 2011/0086243 | A1 * | 4/2011 | Bae | H01M 50/588 429/7 |
| 2013/0330595 | A1 | 12/2013 | Lee et al. | |
| 2018/0169790 | A1 * | 6/2018 | Jin | B23K 26/244 |
| 2019/0321945 | A1 | 10/2019 | Jung et al. | |
| 2019/0386283 | A1 | 12/2019 | Lee et al. | |
| 2020/0020915 | A1 | 1/2020 | Chi et al. | |
| 2020/0112014 | A1 | 4/2020 | Kim et al. | |
| 2020/0266416 | A1 | 8/2020 | Lee et al. | |
| 2020/0350547 | A1 | 11/2020 | Chi et al. | |
| 2020/0368855 | A1 | 11/2020 | Kim et al. | |
| 2022/0255197 | A1 * | 8/2022 | Shin | H01M 50/517 |
| 2023/0223577 | A1 * | 7/2023 | Sohn | H01M 10/0404 29/730 |
| 2023/0223632 | A1 * | 7/2023 | Sohn | B23K 37/0443 429/100 |
| 2024/0006725 | A1 * | 1/2024 | Lee | H01M 50/531 |

FOREIGN PATENT DOCUMENTS

| | | | | | |
|---|---|---|---|---|---|
| CN | 110087825 | A | | 8/2019 | |
| CN | 110280950 | A | * | 9/2019 | |
| KR | 970027653 | U | | 7/1997 | |
| KR | 200133699 | Y1 | | 2/1999 | |
| KR | 20110105620 | A | | 9/2011 | |
| KR | 20150049463 | A | | 5/2015 | |
| KR | 20150125387 | A | | 11/2015 | |
| KR | 101750086 | B1 | | 6/2017 | |
| KR | 20180033868 | A | | 4/2018 | |
| KR | 20180056309 | A | | 5/2018 | |
| KR | 20180082914 | A | | 7/2018 | |
| KR | 20190029037 | A | | 3/2019 | |
| KR | 20190040402 | A | | 4/2019 | |
| KR | 20190040759 | A | | 4/2019 | |
| KR | 20190073933 | A | | 6/2019 | |
| KR | 20190115939 | A | | 10/2019 | |
| WO | WO-2013160932 | A1 | * | 10/2013 | H01M 50/536 |
| WO | WO-2018131843 | A1 | * | 7/2018 | B23K 26/21 |
| WO | 2019074211 | A1 | | 4/2019 | |
| WO | 2019135505 | A1 | | 7/2019 | |
| WO | 2019194416 | A1 | | 10/2019 | |

OTHER PUBLICATIONS

Machine English Translation of CN-208889813-U (Year: 2019).*
Machine English Translation of CN-110280950-A (Year: 2019).*
Machine English translation of WO-2013160932-A1 (Year: 2013).*
Extended European Search Report including Written Opinion for Application No. 20877957.9 dated Oct. 27, 2022, pp. 1-8.
International Search Report for PCTKR2020012798 dated Dec. 23, 2020, 2 pgs.

* cited by examiner

WELDING JIG

CROSS REFERENCE TO RELATED APPLICATIONS

The present application is a national phase entry under 35 U.S.C. § 371 of International Application No. PCT/KR2020/012798 filed on Sep. 22, 2020, which claims priority to Korean Patent Application No. 10-2019-0130073 filed on Oct. 18, 2019 in the Republic of Korea, the disclosures of which are incorporated herein by reference.

TECHNICAL FIELD

The present disclosure relates to a welding jig.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attention as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may vary according to the required output voltage or the required charge/discharge capacity.

Meanwhile, when a plurality of battery cells are connected in series or in parallel to configure a battery pack, it is common to configure a battery module having at least one battery cell first, and then configure a battery pack by using at least one battery module and adding other components.

In the case of a conventional battery module, an electrode lead of a battery cell and a sensing bus bar of a bus bar assembly are closely pressed using a welding jig to weld the electrode lead and the sensing bus bar by laser welding or the like.

However, in the case of the conventional welding jig, the welding position is frequently deviated due to an assembly tolerance or a position tolerance between the electrode lead and the sensing bus bar. If the welding position is deviated, the welding quality is deteriorated, which may cause a defect in the battery module.

Therefore, there is a demand to find a measure for providing a welding jig that may guide the components to an appropriate designated position so that the welding position is not deviated when welding the electrode lead of the battery cell and the sensing bus bar.

DISCLOSURE

Technical Problem

The present disclosure is directed to providing a welding jig which may guide positioning to a designated position so that welding quality is not deteriorated when welding an electrode lead of a battery cell and a sensing bus bar.

In addition, the present disclosure is also directed to providing a welding jig which may bring the electrode lead and the sensing bus bar into close contact with each other more effectively when welding the electrode lead of the battery cell and the sensing bus bar.

Technical Solution

In one aspect of the present disclosure, there is provided a welding jig for welding an electrode lead of a battery cell and a sensing bus bar of a bus bar assembly to each other, the welding jig comprising: a jig body disposed above the electrode lead and the sensing bus bar during the welding; and a positioning guide unit coupled to the jig body and configured to make a step correction in at least any one direction among three pairs of opposing directions when the electrode lead and the sensing bus bar are welded.

The positioning guide unit may include a first positioning guider coupled to the jig body and configured to be elastically movable in an upper and lower direction of the jig body; and a second positioning guider coupled to the jig body and configured to be elastically movable in a left and right direction of the jig body.

The positioning guide unit may include a third positioning guider coupled to the jig body and configured to be tiltable at a predetermined angle in an upper and lower direction at left and right sides of the jig body.

The first positioning guider may include a vertical positioning guider configured to be movable along an upper and lower direction of the jig body and positioned to contact a top end of the sensing bus bar; and a vertical elastic portion elastically connected to the vertical positioning guider and configured to guide movement of the vertical positioning guider.

The vertical positioning guider may have at least one positioning protrusion for fixing the sensing bus bar.

The sensing bus bar may have at least one positioning groove in which the at least one positioning protrusion is inserted.

The second positioning guider may include a side positioning guider configured to be movable along a left and right direction of the jig body and adapted to press the electrode lead toward the sensing bus bar; and a side elastic portion elastically connected to the side positioning guider and configured to guide movement of the side positioning guider.

The second positioning guider may have a manipulation lever coupled to the side elastic portion and configured to guide a user manipulation for moving the side positioning guider.

The third positioning guider may include a tilting body coupled to the jig body and configured to be tiltable at the predetermined angle; and a tilting guider connected to the tilting body and configured to guide a tilting operation of the tilting body.

The tilting guider may have a tilting lever configured to guide a user manipulation for the tilting operation.

Advantageous Effects

According to various embodiments as described below, it is possible to provide a welding jig which may guide positioning to a designated position so that welding quality is not deteriorated when welding an electrode lead of a battery cell and a sensing bus bar.

In addition, according to various embodiments as described below, it is possible to provide a welding jig which may bring the electrode lead and the sensing bus bar into close contact with each other more effectively when welding the electrode lead of the battery cell and the sensing bus bar.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
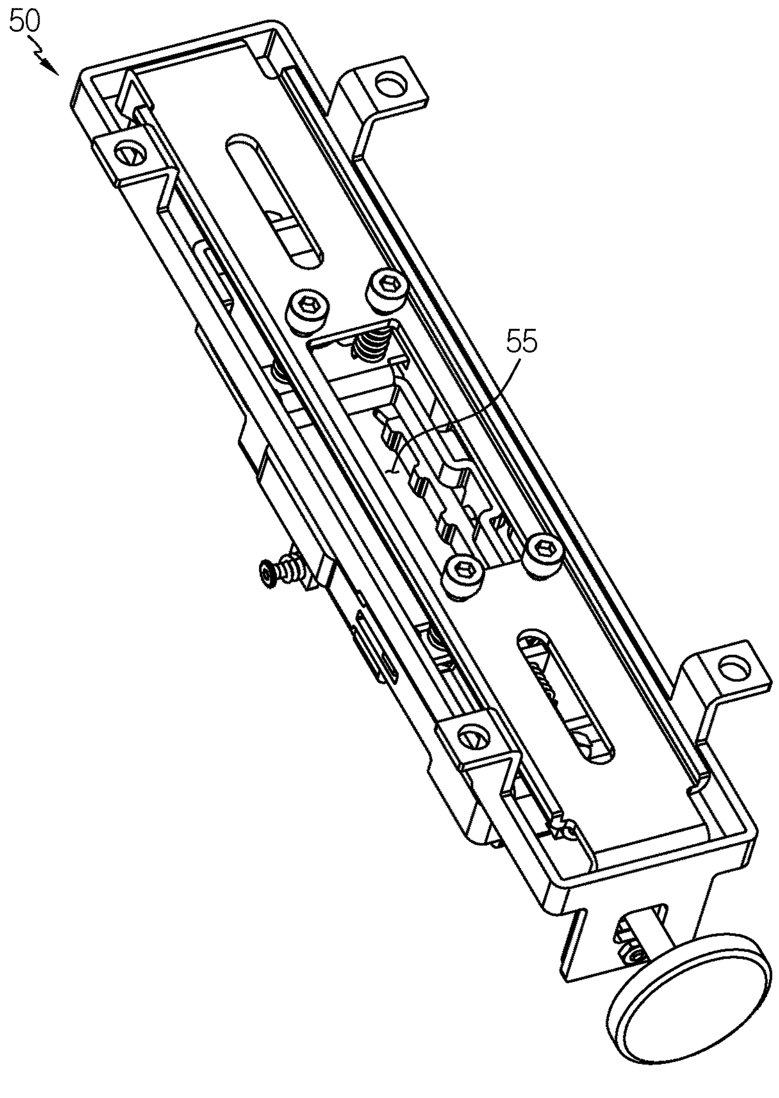
FIG. 1 is a diagram for illustrating a welding jig according to an embodiment of the present disclosure.
Figure 2:
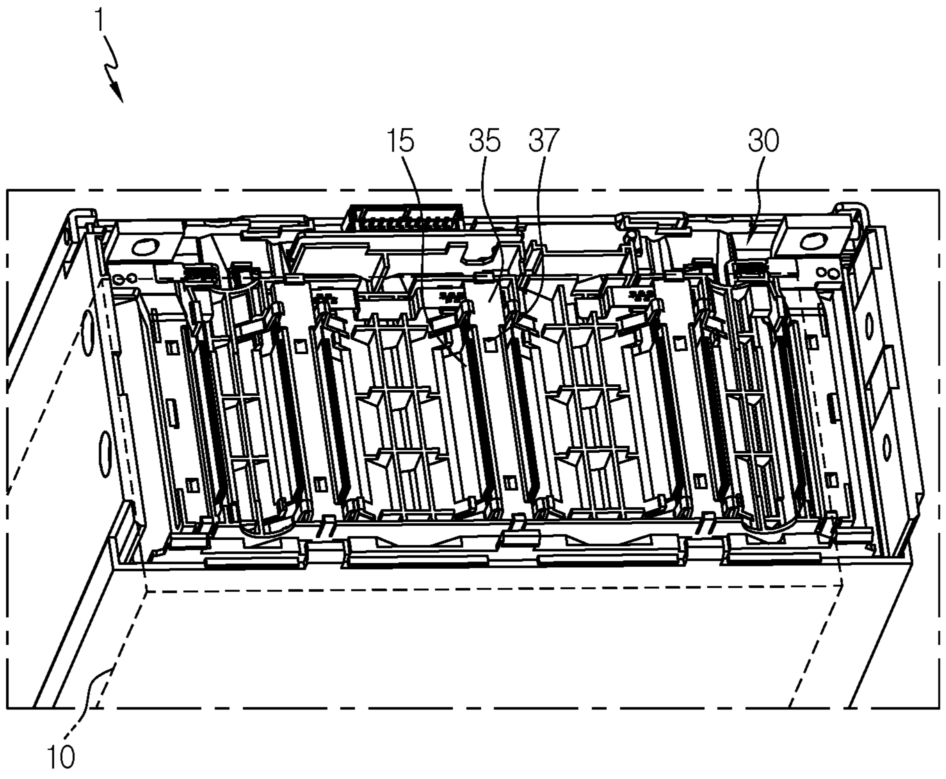
FIG. 2 is a diagram for illustrating electrode leads of a battery cell and a sensing bus bar of a bus bar assembly, which are welded using the welding jig of FIG. 1.
Figure 3:
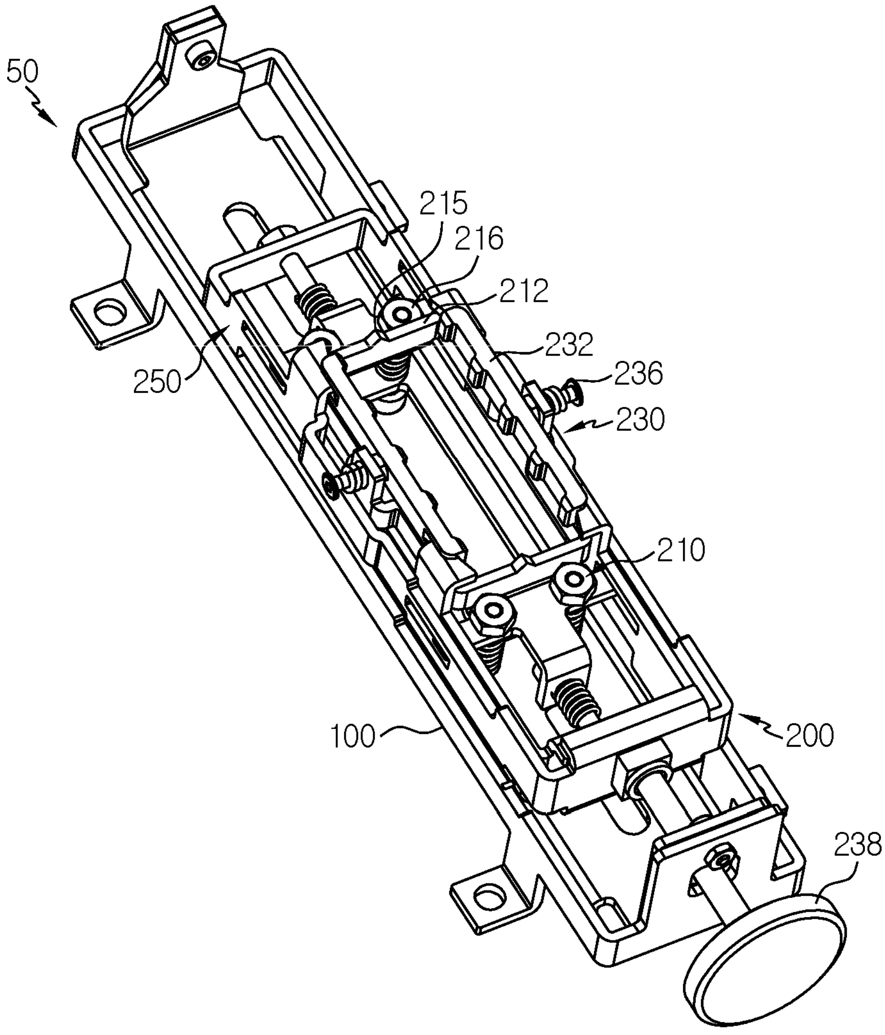
FIG. 3 is a diagram for illustrating a bottom portion of the welding jig of FIG. 1.
Figure 4:
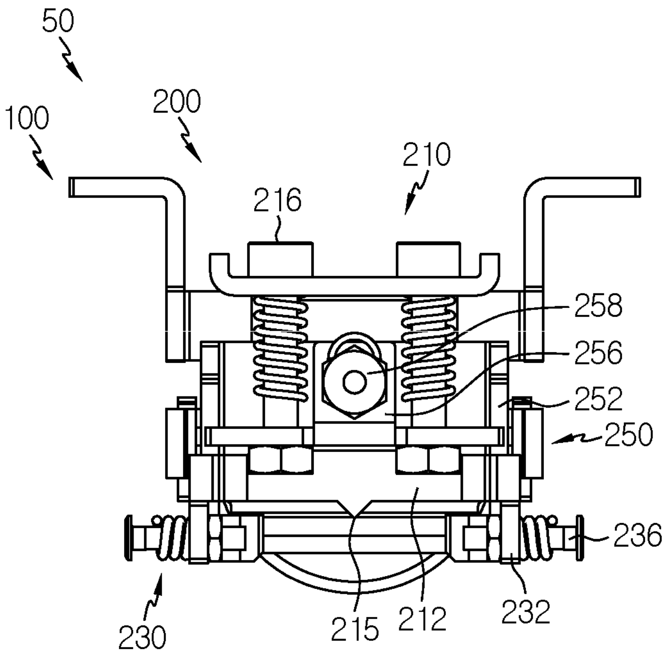
FIG. 4 is a side view showing the welding jig of FIG. 1.
Figure 5:
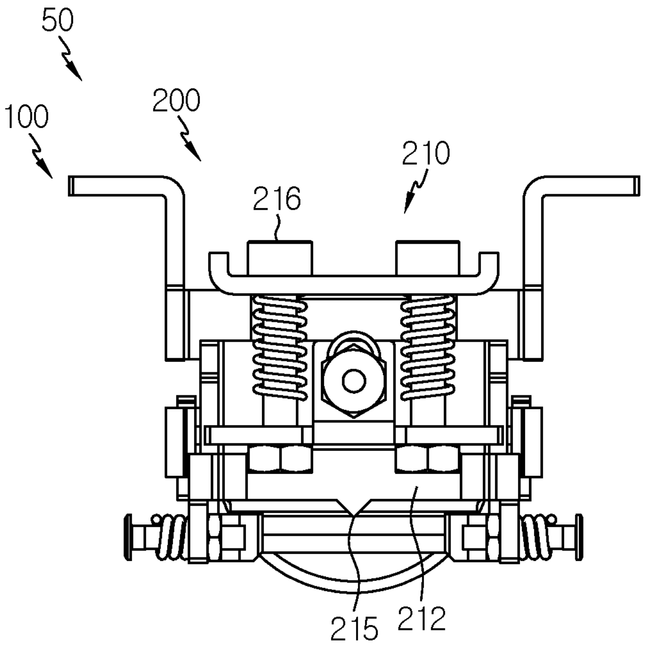
FIGS. 5 and 6 are diagrams for illustrating an operation of a first positioning guider of a positioning guide unit, employed at the welding jig of FIG. 1.
Figure 6:
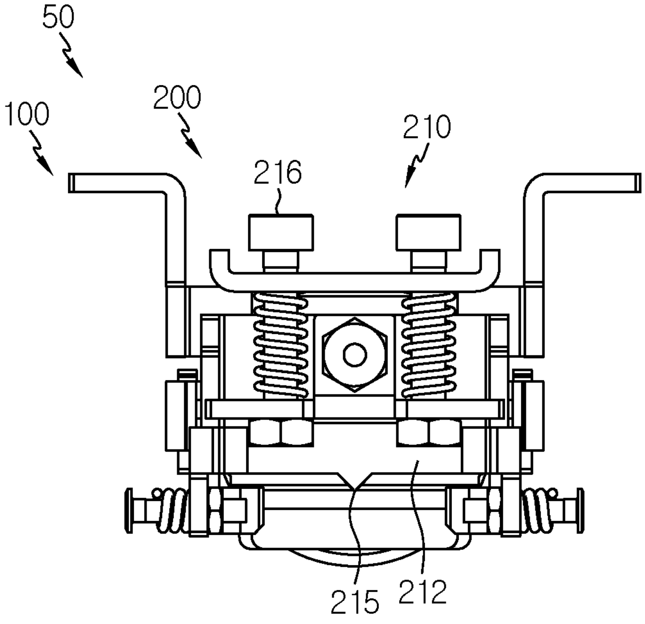
Figure 7:
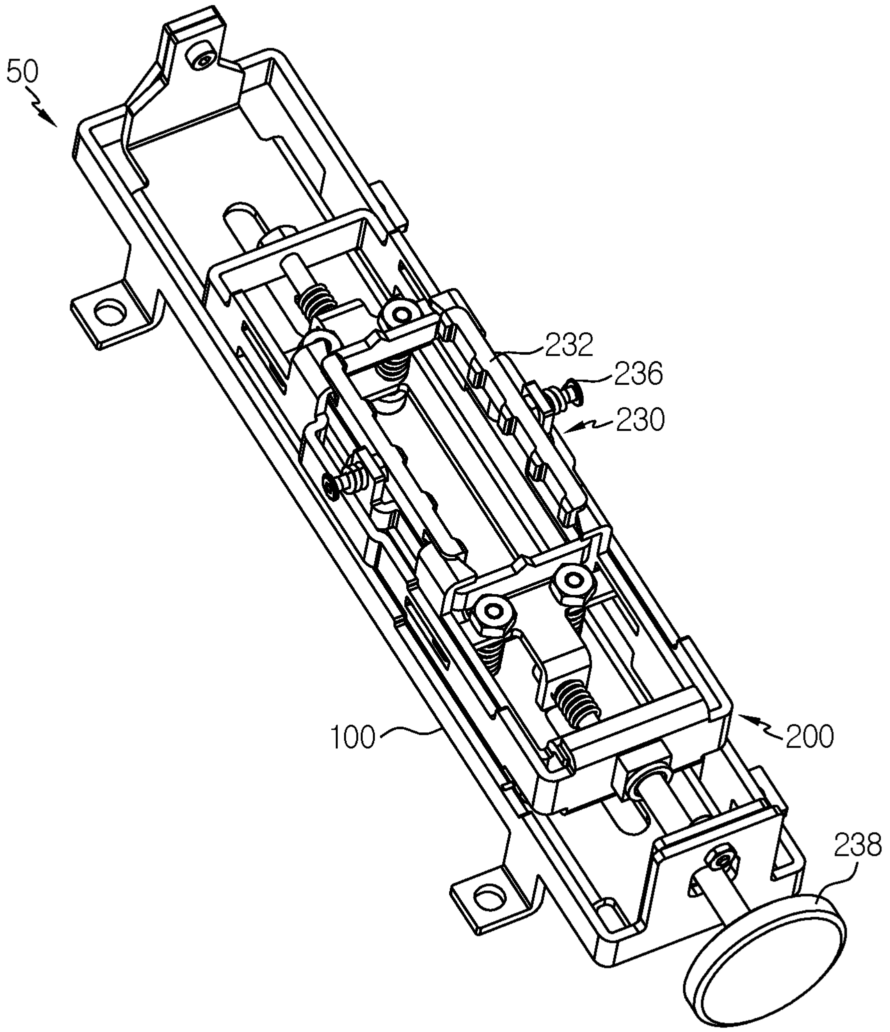
FIGS. 7 and 8 are diagrams for illustrating an operation of a second positioning guider of the positioning guide unit, employed at the welding jig of FIG. 1.
Figure 8:
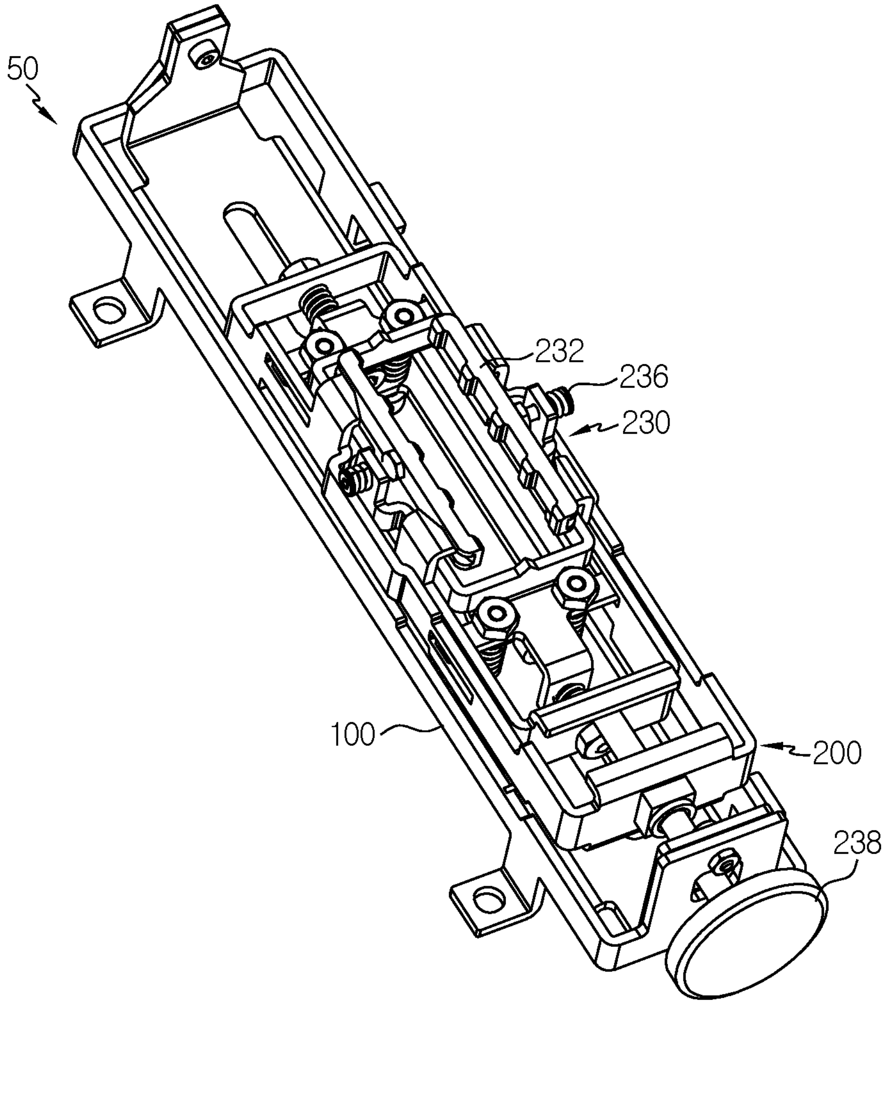
Figure 9:
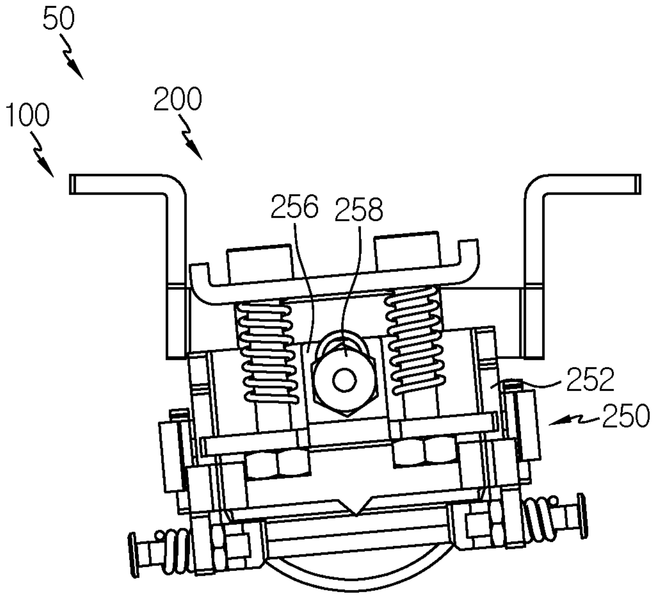
FIG. 9 is a diagram for illustrating an operation of a third positioning guider of the positioning guide unit, employed at the welding jig of FIG. 1.

FIG. 1 is a diagram for illustrating a welding jig according to an embodiment of the present disclosure, FIG. 2 is a diagram for illustrating electrode leads of a battery cell and a sensing bus bar of a bus bar assembly, which are welded using the welding jig of FIG. 1, FIG. 3 is a diagram for illustrating a bottom portion of the welding jig of FIG. 1, FIG. 4 is a side view showing the welding jig of FIG. 1, FIGS. 5 and 6 are diagrams for illustrating an operation of a first positioning guider of a positioning guide unit, employed at the welding jig of FIG. 1, FIGS. 7 and 8 are diagrams for illustrating an operation of a second positioning guider of the positioning guide unit, employed at the welding jig of FIG. 1, and FIG. 9 is a diagram for illustrating an operation of a third positioning guider of the positioning guide unit, employed at the welding jig of FIG. 1.

Referring to FIGS. 1 to 9, a welding jig 50 is provided for welding an electrode lead 15 of at least one battery cell 10 of a battery module 1 and a sensing bus bar 35 of a bus bar assembly 30 to each other, and may have a welding opening 55 for laser welding or the like.

The welding jig 50 may include a jig body 100 and a positioning guide unit 200.

The jig body 100 forms an appearance of the welding jig 50 and may have the welding opening 55 at the center thereof. The jig body 100 may be disposed above the electrode lead 15 of the at least one battery cell 10 and the sensing bus bar 35 of the bus bar assembly 30 during welding.

The positioning guide unit 200 is coupled to the jig body, and during the welding, the positioning guide unit 200 may bring the electrode lead 15 of the at least one battery cell 10 and the sensing bus bar 35 of the bus bar assembly 30 into close contact with each other and allow the electrode lead 15 and the sensing bus bar 35 to be positioned at desired locations.

The positioning guide unit 200 may correct a step in at least three directions when welding the electrode lead 15 of the at least one battery cell 10 and the sensing bus bar 35 of the bus bar assembly 30.

Hereinafter, the positioning guide unit 200 according to this embodiment will be described in more detail.

The positioning guide unit 200 may include a first positioning guider 210, a second positioning guider 230, and a third positioning guider 250.

The first positioning guider 210 is provided to the jig body 100 and may slide to be elastically movable along an upper and lower direction of the jig body 100.

The first positioning guider 210 may include a vertical positioning guider 212 and a vertical elastic portion 216.

The vertical positioning guider 212 is movable along the upper and lower directions of the jig body 100 and may contact the electrode lead 15 of the at least one battery cell 10 and a top end of the sensing bus bar 35 of the bus bar assembly 30.

The vertical positioning guider 212 may have at least one positioning protrusion 215 for fixing the sensing bus bar 35. Meanwhile, the sensing bus bar 35 may have at least one positioning groove 37 in which the at least one positioning protrusion 215 may be inserted.

The vertical elastic portion 216 is elastically connected to the vertical positioning guider 212 and may guide the sliding movement of the vertical positioning guider 212 along the upper and lower direction.

The second positioning guider 230 is provided to the jig body 100 and may slide to be elastically movable along a left and right direction of the jig body 100.

The second positioning guider 230 may include a side positioning guider 232, a side elastic portion 236, and a manipulation lever 238.

The side positioning guider 232 is movable along the left and right directions of the jig body 100 and may pressurize the electrode lead 15 of the at least one battery cell 10 toward the sensing bus bar 35 of the bus bar assembly 30 so that the electrode lead 15 and the sensing bus bar 35 are brought into close contact with each other.

The side elastic portion 236 is elastically connected to the side positioning guider 232 and may guide the sliding movement of the side positioning guider 232 along the left and right directions.

The manipulation lever 238 is connected to the side elastic portion 236 and may guide a user manipulation for moving the side positioning guider 232. By manipulating the manipulation lever 238, a user or the like may elastically slide the side positioning guider 232 in the left and right directions.

The third positioning guider 250 is coupled to the jig body 100 and may be provided to be tiltable at a predetermined angle in the upper and lower directions at left and right sides of the jig body 100.

The third positioning guider 250 may include a tilting body 252 and a tilting guider 256.

The tilting body 252 is coupled to the jig body 100 and may be provided to be tiltable at the predetermined angle. The tilting operation at the predetermined angle may be a rotating operation.

The tilting guider 256 is connected to the tilting body 252 and may guide the tilting operation of the tilting body 252. The tilting guider 256 may include a tilting lever 258.

The tilting lever 258 is coupled to the tilting guider 256 and may guide a tilting operation via user manipulation. By manipulating the tilting lever 258, the user or the like may rotate the tilting body 252 by a tilting operation at a predetermined angle.

Hereinafter, the detailed operation of the welding jig 50 according to this embodiment will be described in more detail.

FIGS. 10 to 13 are diagrams for illustrating a step correction using the welding jig of FIG. 1 when a step occurs due to the protrusion of only the sensing bus bar while the electrode leads of the battery cell and the sensing bus bar of the bus bar assembly are welded.

Figure 10:
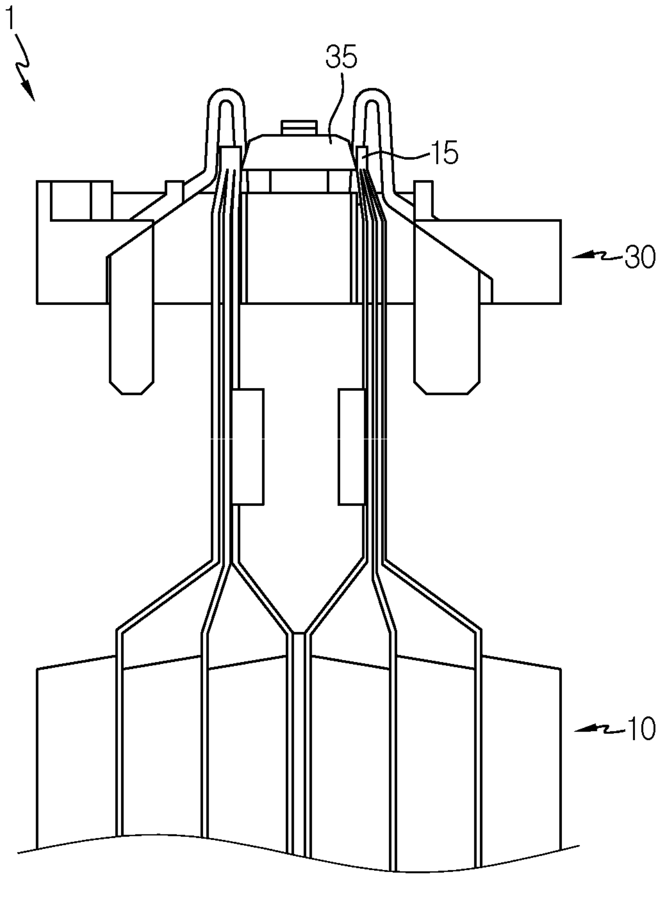
FIGS. 10 to 13 are diagrams for illustrating a step correction using the welding jig of FIG. 1 when a step occurs due to the protrusion of only the sensing bus bar while the electrode leads of the battery cell and the sensing bus bar of the bus bar assembly are welded.

Referring to FIG. 10, in the battery module 1, before the electrode lead 15 of the at least one battery cell 10 and the sensing bus bar 35 of the bus bar assembly 30 are welded, a step may form between the lead electrode 15 and the sensing bus bar 35 due to an assembly tolerance or a position tolerance. For example, the sensing bus bar 35 of the bus bar assembly 30 may protrude higher than the electrode lead 15 of the at least one battery cell 10.

Figure 11:
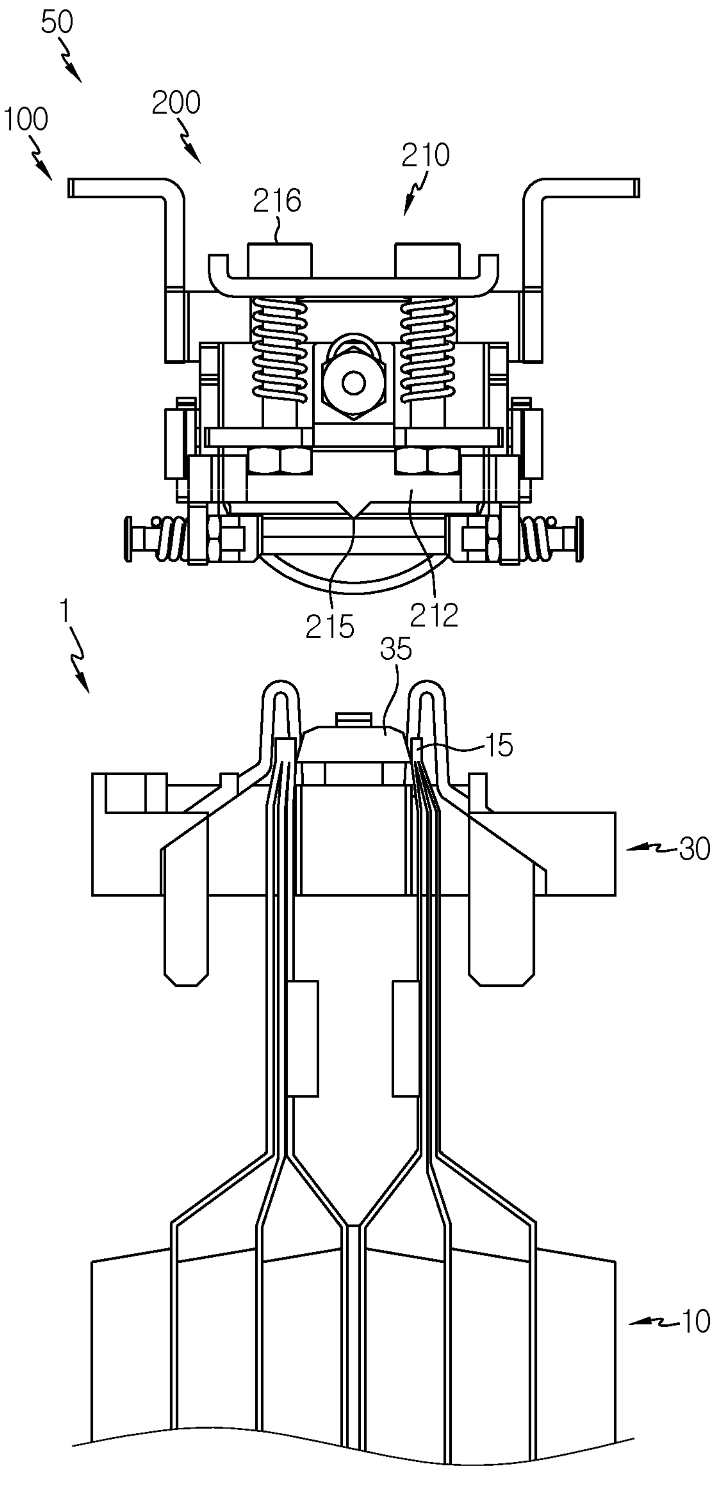
Figure 12:
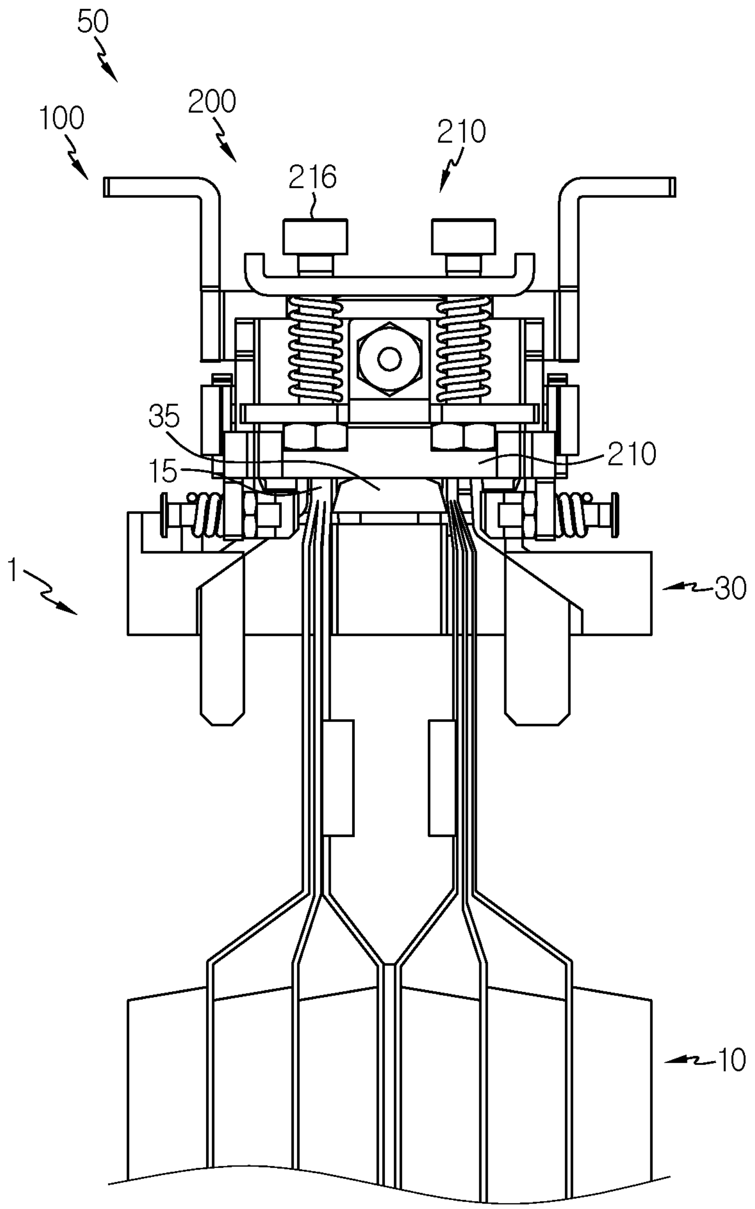

Referring to FIGS. 11 and 12, even when the sensing bus bar 35 protrudes upwardly higher than the electrode lead 15, the welding jig 50 according to this embodiment may adjust the step between the electrode lead 15 and the sensing bus bar 35.

Specifically, the step may be corrected using the first positioning guider 210 of the positioning guide unit 200. More specifically, the vertical positioning guider 212 of the first positioning guider 210 may be brought into close contact with the sensing bus bar 35 and then absorb the relative step between the electrode lead 15 and the sensing bus bar 35 while sliding in the upper and lower directions according to the elastic pressing force of the vertical elastic portion 216. By means of the first positioning guider 210, the step between the electrode lead 15 and the sensing bus bar 35 in the upper and lower directions according to the height may be corrected.

Figure 13:
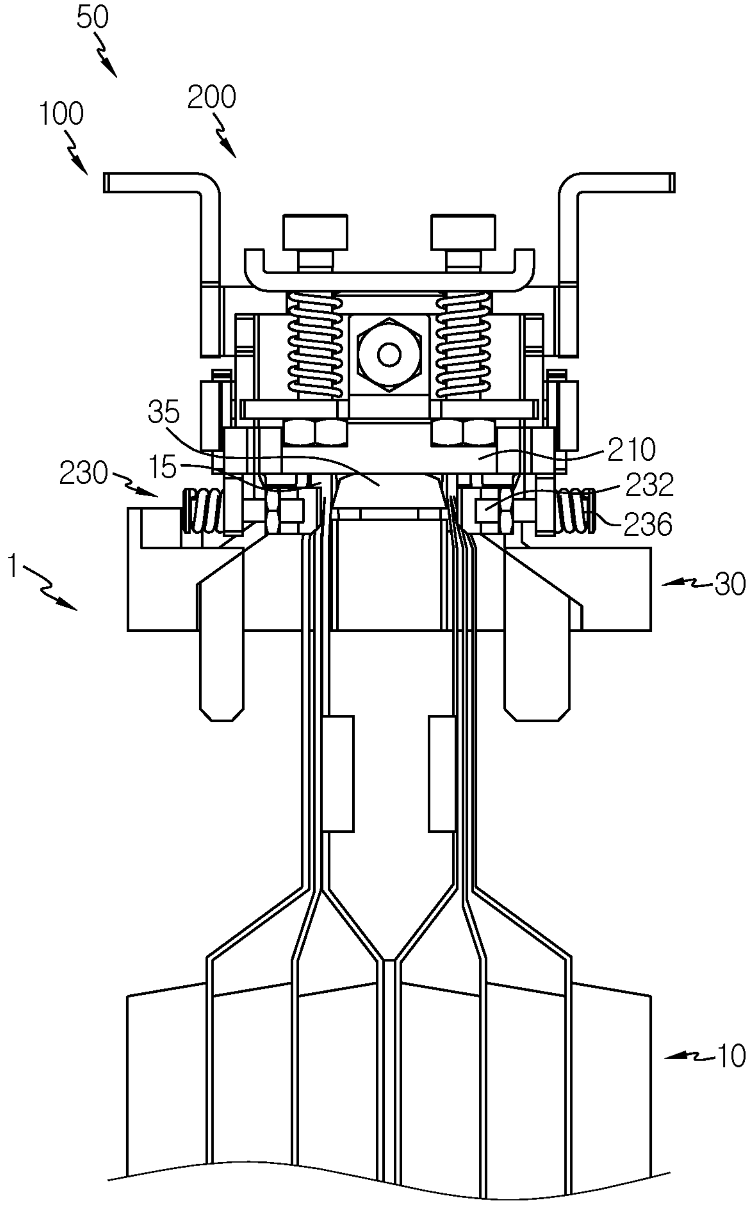

Referring to FIG. 13, the user, namely a manufacturer or the like, may bring the electrode lead 15 of the at least one battery cell 10 and the sensing bus bar 35 of the bus bar assembly 30 into close contact with each other in the left and right directions by using the second positioning guider 230 of the positioning guide unit 200.

Specifically, the user may bring the electrode lead 15 and the sensing bus bar 35 into close contact with each other by manipulating the manipulation lever 238 (see FIGS. 7 and 8) of the second positioning guider 230 so that the side positioning guider 232 of the second positioning guider 230 slides in the left and right directions. Here, the side elastic portion 236 of the second positioning guider 230 may provide an elastic pressing force toward the side positioning guider 232 in the left and right directions. After that, the user may weld the electrode lead 15 and the sensing bus bar 35 to each other by laser welding or the like.

FIGS. 14 to 17 are diagrams for illustrating a step correction using the welding jig of FIG. 1 when the electrode leads and the sensing bus bar have different protruding heights while the electrode leads of the battery cell and the sensing bus bar of the bus bar assembly are welded.

Figure 14:
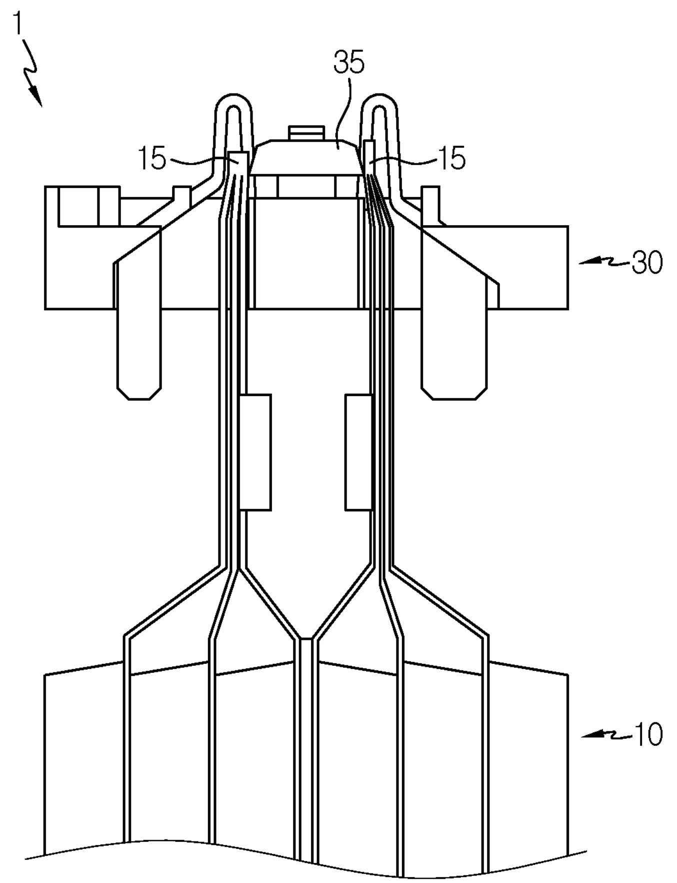
FIGS. 14 to 17 are diagrams for illustrating a step correction using the welding jig of FIG. 1 when the electrode leads and the sensing bus bar have different protruding heights while the electrode leads of the battery cell and the sensing bus bar of the bus bar assembly are welded.

Referring to FIG. 14, a step may form anywhere along the sensing bus bar 35 and the electrode leads 15 at both sides of the sensing bus bar 35 due to an assembly tolerance or a location tolerance of the battery module 1 before welding. For example, the electrode lead 15 and the sensing bus bar 35 may be arranged in an inclined form from each other at a predetermined angle so that the electrode lead 15 at a left side of the sensing bus bar 35 has a relatively lower height and the electrode lead 15 at a right side of the sensing bus bar 35 has a relatively higher height.

Figure 15:
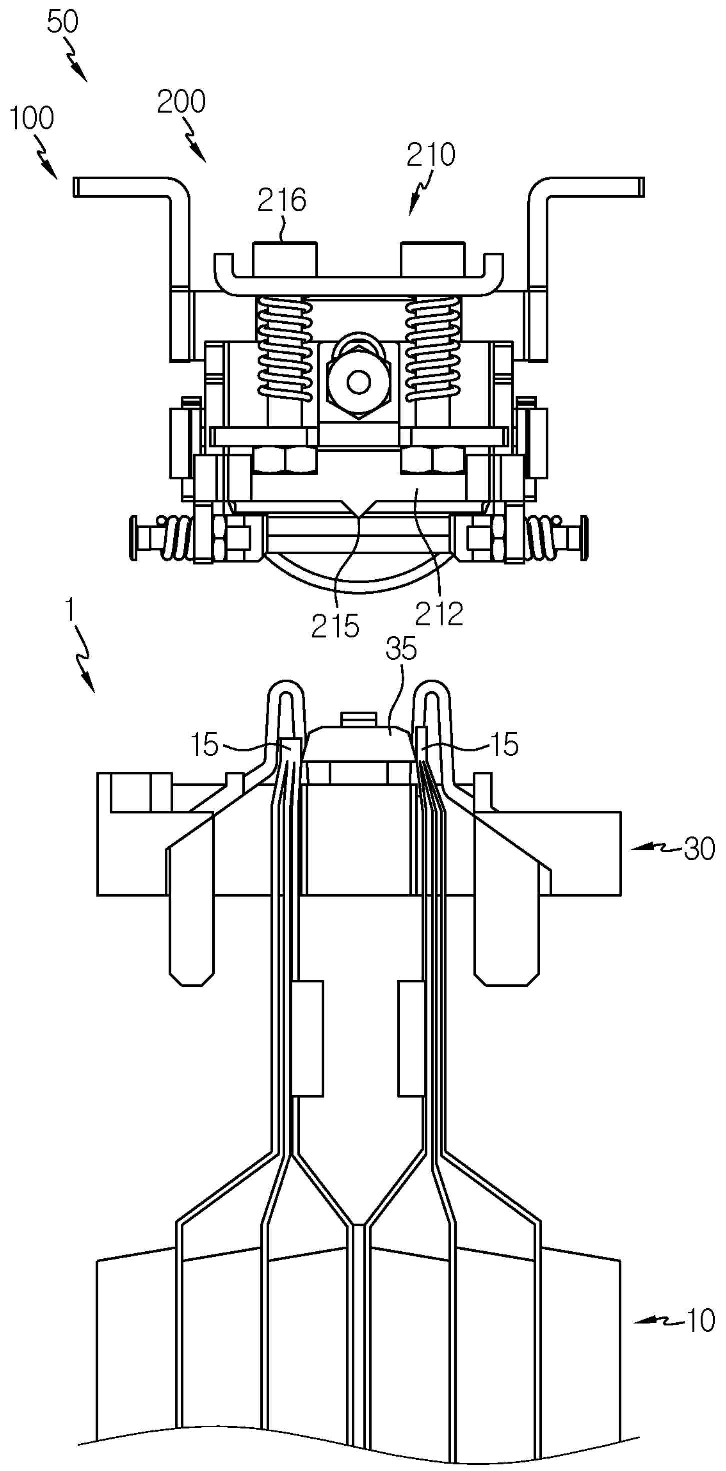
Figure 16:
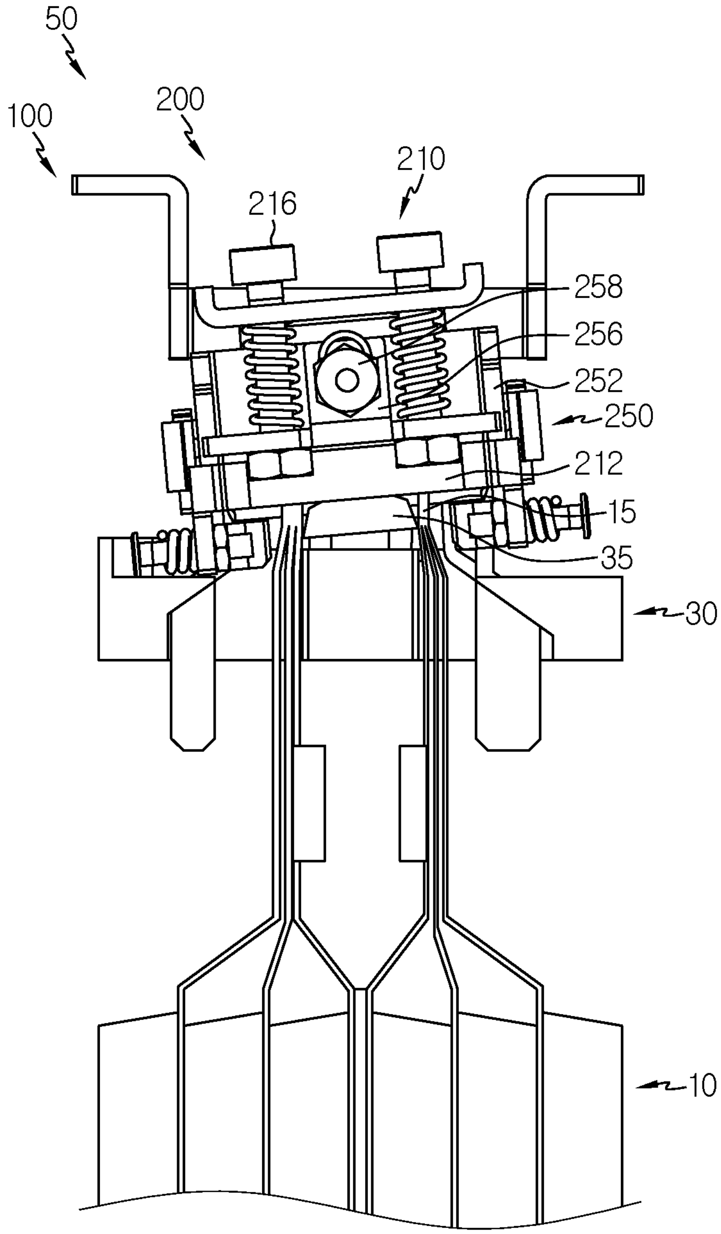

Referring to FIGS. 15 and 16, even when such a step forms, the welding jig 50 may guide the electrode leads 15 and the sensing bus bar 35 to predetermined designated positions by correcting the step using the positioning guide unit 200.

Specifically, the step in an inclined shape at the predetermined angle may be corrected by means of the third positioning guider 210 of the positioning guide unit 200.

Specifically, the user may tilt the tilting body 252 by manipulating the tilting lever 258 of the tilting guider 256 of the third positioning guider 210. According to this tilting operation, the electrode leads 15 and the sensing bus bar 35 may be tilted according to the step angle, so that the step between them may be corrected. At this time, the first positioning guider 210 of the positioning guide unit 200 may press the sensing bus bar 35 to correct the step together with the third positioning guider 230.

Figure 17:
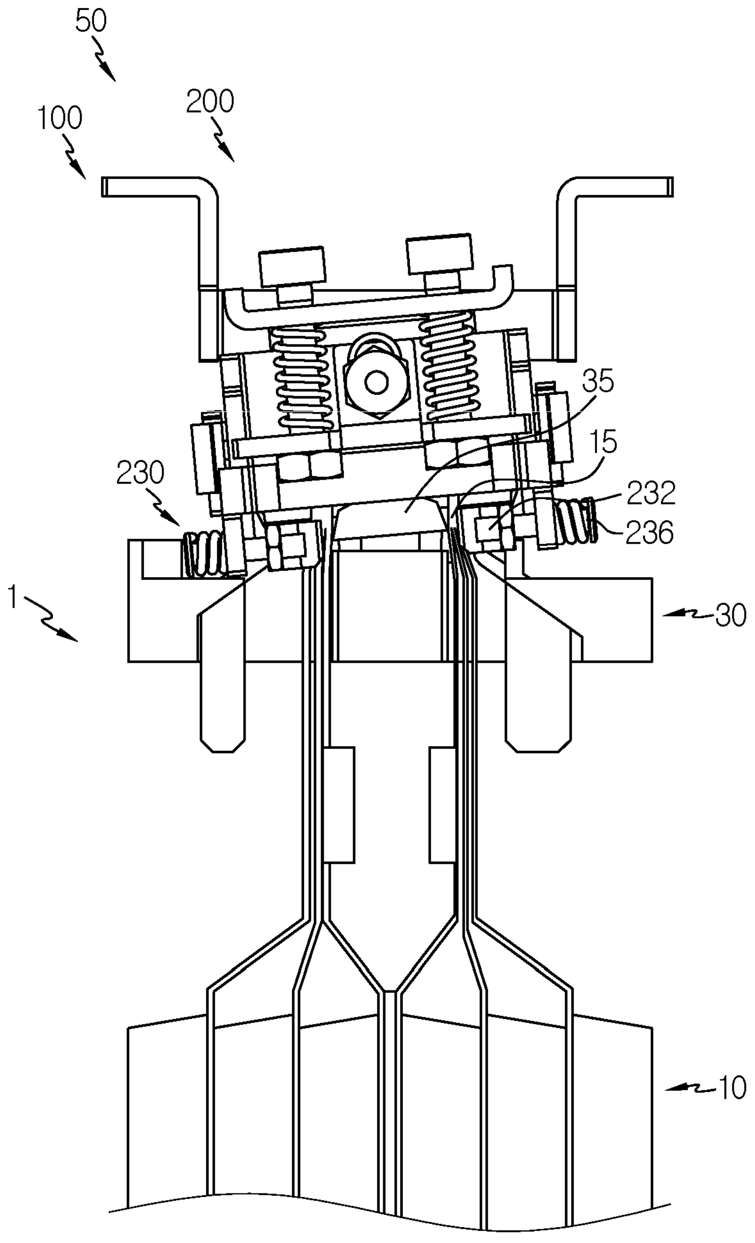

Referring to FIG. 17, the user may manipulate the manipulation lever 238 (see FIGS. 7 and 8) of the second positioning guider 230 so that the side positioning guider 232 of the second positioning guider 230 slides in the left and right directions to bring the electrode lead 15 and the sensing bus bar 35 into close contact with each other. After that, the user may weld the electrode lead 15 and the sensing bus bar 35 to each other by laser welding or the like.

As described above, even if an assembly tolerance or position tolerance occurs between the electrode lead 15 of the at least one battery cell 10 and the sensing bus bar 35 of the bus bar assembly 30, the welding jig 50 according to this embodiment may guide to an appropriate designated position for welding by correcting the step formed due to the tolerance.

Therefore, the welding jig 50 according to this embodiment may effectively prevent the welding position from being deviated due to the assembly tolerance or the position tolerance, thereby leading to uniform welding quality between the electrode lead 15 and the sensing bus bar 35.

According to various embodiments as described above, it is possible to provide a welding jig 50, which may guide positioning to a designated position so that welding quality is not deteriorated when welding an electrode lead 15 of a battery cell 10 and a sensing bus bar 35.

In addition, according to various embodiments as described above, it is possible to provide a welding jig 50, which may bring the electrode lead 15 and the sensing bus bar 35 into close contact with each other more effectively when welding the electrode lead 15 of the battery cell 10 and the sensing bus bar 35.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A welding jig comprising:

a jig body positioned to weld an electrode lead and a sensing bus bar to each other; and a positioning guide clamp coupled to the jig body and configured to make a step correction in at least any one direction among three pairs of opposing directions when the electrode lead and the sensing bus bar are welded, the positioning guide clamp including:

an elastic first positioning guider coupled to the jig body and configured to be elastically movable in first and second opposing directions of the jig body;

an elastic second positioning guider coupled to the jig body and configured to be elastically movable in third and fourth opposing directions of the jig body; and a third positioning guider including a tilting lever, the third positioning guider coupled to the jig body and configured to be tiltable in the third and fourth opposing directions at a predetermined angle in the first and second opposing directions at first and second sides of the jig body, wherein the elastic second positioning guider is coupled to a manipulation lever such that a force applied to the manipulation lever in a fifth direction is configured to cause movement of the elastic second positioning guider in the third and fourth opposing directions, the fifth direction being perpendicular to the third and fourth opposing directions, wherein the welding jig is configured to bring the electrode lead and sensing bus bar into close contact in the third and fourth opposing directions.

2. The welding jig according to claim 1, wherein the elastic first positioning guider includes:

a vertical positioning bar configured to be movable along the first and second opposing directions of the jig body and provided to contact a first end of the sensing bus bar; and a vertical elastic portion elastically coupled to the vertical positioning bar and configured to guide movement of the vertical positioning bar.

3. The welding jig according to claim 2, wherein the vertical positioning bar has at least one positioning protrusion for fixing the sensing bus bar.

4. The welding jig according to claim 3, wherein the sensing bus bar has at least one positioning groove configured to receive the at least one positioning protrusion.

5. The welding jig according to claim 1, wherein the elastic second positioning guider includes:

a side positioning guider configured to be movable along the third and fourth opposing directions of the jig body and provided to press the electrode lead toward the sensing bus bar; and a side elastic portion elastically connected to the side positioning guider and configured to guide movement of the side positioning guider.

6. The welding jig according to claim 5, wherein the manipulation lever is coupled to the side elastic portion and configured to guide a user manipulation for moving the side positioning guider.

7. The welding jig according to claim 1, wherein the third positioning guider includes:

a tilting body coupled to the jig body and configured to be tiltable at the predetermined angle; and a tilting guider coupled to the tilting body and configured to guide a tilting operation of the tilting body.

8. The welding jig according to claim 7, wherein the tilting lever is configured to guide a user manipulation for the tilting operation.

* * * * *